US011494693B2

(12) United States Patent
Pezzillo et al.

(10) Patent No.: US 11,494,693 B2
(45) Date of Patent: Nov. 8, 2022

(54) MACHINE LEARNING MODEL RE-TRAINING BASED ON DISTRIBUTED FEEDBACK

(71) Applicant: NAMI ML INC., Boulder, CO (US)

(72) Inventors: Joseph D. Pezzillo, Boulder, CO (US); Daniel Burcaw, Denver, CO (US)

(73) Assignee: NAMI ML INC., Boulder, CO (US)

( * ) Notice: Subject to any disclaimer, the term of this patent is extended or adjusted under 35 U.S.C. 154(b) by 707 days.

(21) Appl. No.: 16/428,540

(22) Filed: May 31, 2019

(65) Prior Publication Data

US 2019/0370686 A1 Dec. 5, 2019

Related U.S. Application Data

(60) Provisional application No. 62/681,200, filed on Jun. 6, 2018, provisional application No. 62/679,256, filed on Jun. 1, 2018.

(51) Int. Cl.
*G06N 20/00* (2019.01)
*H04L 67/10* (2022.01)
*G06N 5/04* (2006.01)

(52) U.S. Cl.
CPC ............ *G06N 20/00* (2019.01); *G06N 5/048* (2013.01); *H04L 67/10* (2013.01)

(58) Field of Classification Search
CPC ........ G06N 20/00; G06N 5/048; H04L 67/10; H04L 67/22; H04L 41/16; H04N 21/251; H04N 21/466; G06F 7/023
See application file for complete search history.

(56) References Cited

U.S. PATENT DOCUMENTS 9,135,348 B2 9/2015 Wu et al.
9,996,804 B2 6/2018 Bowers et al.
(Continued)

FOREIGN PATENT DOCUMENTS

WO 2018125264 A1 7/2018
WO 2018166801 A1 9/2018

OTHER PUBLICATIONS

Non-Final Office Action issued in related U.S. Appl. No. 16/428,591 dated Apr. 19, 2021, 18 pages.
(Continued)

*Primary Examiner* — Michael Won
(74) *Attorney, Agent, or Firm* — Holzer Patel Drennan

(57) ABSTRACT

Machine learning model re-training based on distributed feedback received from a plurality of edge computing devices is provided. A trained instance of a machine learning model is transmitted, via one or more communications networks, to the plurality of edge computing devices. Feedback data is collected, via the one or more communications networks, from the plurality of edge computing devices. The feedback data includes labeled observations generated by the execution of the trained instance of the machine learning model at the plurality of edge computing devices on unlabeled observations captured by the plurality of edge computing devices. A re-trained instance of the machine learning model is generated from the trained instance using the collected feedback data. The re-trained instance of the machine learning model is transmitted, via the one or more communications networks, to the plurality of edge computing devices.

30 Claims, 8 Drawing Sheets

(56) References Cited

U.S. PATENT DOCUMENTS

| | | | |
|---|---|---|---|
| 10,019,788 B1* | 7/2018 | Kish | G06V 40/103 |
| 10,063,434 B1 | 8/2018 | Khanal et al. | |
| 10,162,850 B1 | 12/2018 | Jain et al. | |
| 10,339,468 B1 | 7/2019 | Johnston et al. | |
| 10,523,682 B1* | 12/2019 | Badawy | G06N 20/00 |
| 10,916,333 B1* | 2/2021 | Yeturu | G06N 5/003 |
| 10,931,692 B1* | 2/2021 | Mota | H04L 63/1458 |
| 10,938,828 B1* | 3/2021 | Badawy | H04L 63/20 |
| 10,977,575 B2 | 4/2021 | Jayaraman | |
| 10,990,850 B1 | 4/2021 | Chen et al. | |
| 2005/0195774 A1 | 9/2005 | Chennikara et al. | |
| 2008/0250265 A1 | 10/2008 | Chang et al. | |
| 2009/0327260 A1 | 12/2009 | Li et al. | |
| 2012/0284212 A1* | 11/2012 | Lin | G06N 20/00 706/12 |
| 2012/0284213 A1* | 11/2012 | Lin | G06N 3/08 706/12 |
| 2012/0323829 A1 | 12/2012 | Stokes et al. | |
| 2013/0339433 A1* | 12/2013 | Li | H04N 21/4756 709/204 |
| 2015/0019204 A1 | 1/2015 | Simard et al. | |
| 2015/0019463 A1* | 1/2015 | Simard | H04L 1/0079 706/12 |
| 2015/0170053 A1 | 6/2015 | Miao | |
| 2015/0254555 A1 | 9/2015 | Williams et al. | |
| 2015/0379429 A1* | 12/2015 | Lee | G06N 20/00 706/11 |
| 2016/0217388 A1 | 7/2016 | Okanohara et al. | |
| 2017/0109322 A1 | 4/2017 | McMahan et al. | |
| 2017/0111515 A1 | 4/2017 | Bandyopadhyay et al. | |
| 2017/0185921 A1 | 6/2017 | Zhang | |
| 2017/0235846 A1 | 8/2017 | Atlas et al. | |
| 2017/0243133 A1* | 8/2017 | Zavesky | G06N 20/00 |
| 2017/0308836 A1 | 10/2017 | Kass | |
| 2017/0364831 A1 | 12/2017 | Ghosh et al. | |
| 2018/0005134 A1* | 1/2018 | Kish | G06N 20/00 |
| 2018/0007055 A1 | 1/2018 | Infante-Lopez et al. | |
| 2018/0018590 A1 | 1/2018 | Szeto et al. | |
| 2018/0025287 A1 | 1/2018 | Mathew et al. | |
| 2018/0032915 A1 | 2/2018 | Nagaraju et al. | |
| 2018/0144214 A1 | 5/2018 | Hsieh et al. | |
| 2018/0246801 A1* | 8/2018 | Krauss | G06N 20/00 |
| 2018/0253665 A1 | 9/2018 | Okanohara et al. | |
| 2018/0276807 A1* | 9/2018 | Kish | G06V 20/53 |
| 2018/0307984 A1 | 10/2018 | Koker et al. | |
| 2018/0308231 A1* | 10/2018 | Kish | G06V 10/44 |
| 2018/0322462 A1 | 11/2018 | Jayaraman et al. | |
| 2018/0330258 A1 | 11/2018 | Harris et al. | |
| 2018/0357556 A1* | 12/2018 | Rai | G06N 20/00 |
| 2018/0359651 A1* | 12/2018 | Mota | H04W 24/02 |
| 2019/0026624 A1 | 1/2019 | Steiner et al. | |
| 2019/0034824 A1 | 1/2019 | Cagadas et al. | |
| 2019/0034829 A1 | 1/2019 | Guim Bernat et al. | |
| 2019/0050746 A1 | 2/2019 | Sanketi et al. | |
| 2019/0057095 A1* | 2/2019 | Chakravarti | G06N 20/00 |
| 2019/0073607 A1 | 3/2019 | Jia et al. | |
| 2019/0108561 A1* | 4/2019 | Shivashankar | G06Q 30/06 |
| 2019/0129732 A1 | 5/2019 | Sivertson | |
| 2019/0138938 A1* | 5/2019 | Vasseur | G06N 3/0454 |
| 2019/0171187 A1* | 6/2019 | Cella | G06N 20/00 |
| 2019/0311298 A1 | 10/2019 | Kopp et al. | |
| 2019/0325350 A1* | 10/2019 | Desai | G06F 16/285 |
| 2019/0354809 A1 | 11/2019 | Ralhan | |
| 2019/0370218 A1* | 12/2019 | Di Pietro | G06K 9/6263 |
| 2020/0125545 A1* | 4/2020 | Idicula | G06F 16/217 |
| 2020/0265301 A1 | 8/2020 | Burger et al. | |
| 2020/0267053 A1* | 8/2020 | Zheng | G06F 9/45558 |
| 2020/0296124 A1 | 9/2020 | Pratt et al. | |
| 2020/0327604 A1* | 10/2020 | Morin | G06N 5/003 |
| 2020/0334524 A1 | 10/2020 | Sprague et al. | |
| 2021/0142177 A1 | 5/2021 | Mallya et al. | |

OTHER PUBLICATIONS

Ray Wenderlich, Core ML and Vision: Machine Learning in iOS 11 Tutorial, https://www.raywenderlich.com/577-core-ml-and-vision-machine-learning-in-ios-11-tutorial, Mar. 11, 2019, pp. 1-7.

PCT Search Report from corresponding PCT Application No. PCT/US2019/035037, dated Aug. 9, 2019.

PCT Written Opinion from corresponding PCT Application No. PCT/US2019/035037, dated Aug. 9, 2019.

\* cited by examiner

MACHINE LEARNING MODEL RE-TRAINING BASED ON DISTRIBUTED FEEDBACK

CROSS-REFERENCE TO RELATED APPLICATIONS

This application claims benefit of priority to U.S. Provisional Patent Application No. 62/679,256, entitled "AWL Model Framework" and filed on Jun. 1, 2018, and to U.S. Provisional Patent Application No. 62/681,20, entitled "AI/ML Model Framework" and filed on Jun. 6, 2018, both of which are specifically incorporated by reference for all that they disclose and teach.

This application is also related to U.S. patent application Ser. No. 16/428,591 [546002USP2], entitled "Machine Learning at Edge Devices Based on Distributed Feedback" and filed concurrently herewith, which is specifically incorporated by reference for all that it discloses and teaches.

BACKGROUND

Machine learning functionality is often relegated to execution in the cloud, where high-performance computing machines with significant resources can be leveraged to perform the often complex computations. In cloud-based machine learning, edge computing devices may be used to collect information (e.g., unlabeled observations) that is sent to the cloud for machine learning computations. The predictive results of such computations can then be returned to the edge computing device and/or transmitted to other systems and services. In the cloud, machine learning models can be updated as information algorithms and training sets are improved. Cloud-based machine learning, however, also presents some disadvantages, including the requirement of an active network connection, communication latencies and costs, and privacy concerns. Furthermore, a "one model fits all," or at least a "few models fit all," paradigm tends to be emphasized in a cloud-based machine learning system, despite the heterogeneous nature of the users and edge computing devices providing the input data and consuming the machine learning results.

SUMMARY

The described technology provides machine learning model re-training based on distributed feedback received from a plurality of edge computing devices. A trained instance of a machine learning model is transmitted, via one or more communications networks, to the plurality of edge computing devices. Feedback data is collected, via the one or more communications networks, from the plurality of edge computing devices. The feedback data includes labeled observations generated by the execution of the trained instance of the machine learning model at the plurality of edge computing devices on unlabeled observations captured by the plurality of edge computing devices. A re-trained instance of the machine learning model is generated from the trained instance using the collected feedback data. The re-trained instance of the machine learning model is transmitted, via the one or more communications networks, to the plurality of edge computing devices.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Edge computing devices implemented with processing/computing capabilities, such as mobile devices, desktops, laptops, tablets, internet of things (IoT) devices, medical equipment, industrial equipment, automobiles and other vehicles, robots, drones, etc., may execute applications that include artificial intelligence/machine learning models (hereinafter referred to as "models" or "ML models"). In some implementations, such devices use sensors and other interfaces to capture input data (unlabeled observations) that can be input to an ML model for generation of a corresponding label and other associated data (e.g., confidence scores, performance scores). In some implementations, a confidence score describes a level of confidence associated with each labeled observation generated by a trained instance of a machine learning model executed by an edge computing device, and a performance score describes accuracy of labeled observations generated by a trained instance of a machine learning model executed at an edge computing device. These ML models may perform various processes that may generate predictions using input data or input datasets. Example predictions include, without limitation, image recognition, product feature or service recommendation, interest predictions (e.g., predictions of potential partners in a dating application). A particular application installed on a device may utilize such ML models for providing features/services to users.

Implementations described herein provide a system for ML model management, model deployment, model feedback, model re-training, user device management, etc. in support of applications executable on edge computing devices. ML models may be selected and deployed based on characteristics shared between edge computing devices. Feedback received from edge computing devices may be used to update/re-train instances of ML models, and the ML models may be tracked, documented, and stored such that ML models may be specifically managed and customized for a single edge computing device (e.g., a particular user of the edge computing device), a group of edge computing devices, etc. ML models are continuously or periodically monitored for accuracy, updated based on feedback, and deployed to various edge computing devices.

The described technology can be implemented in a variety of contexts, including without limitation a consumer context and an enterprise context. The term "enterprise context" is directed to the platform conforms to industry standards for scalability, auditing/compliance, user and customer management, and/or reliability that are generally expected and often required of products for large corporations.

Figure 1:
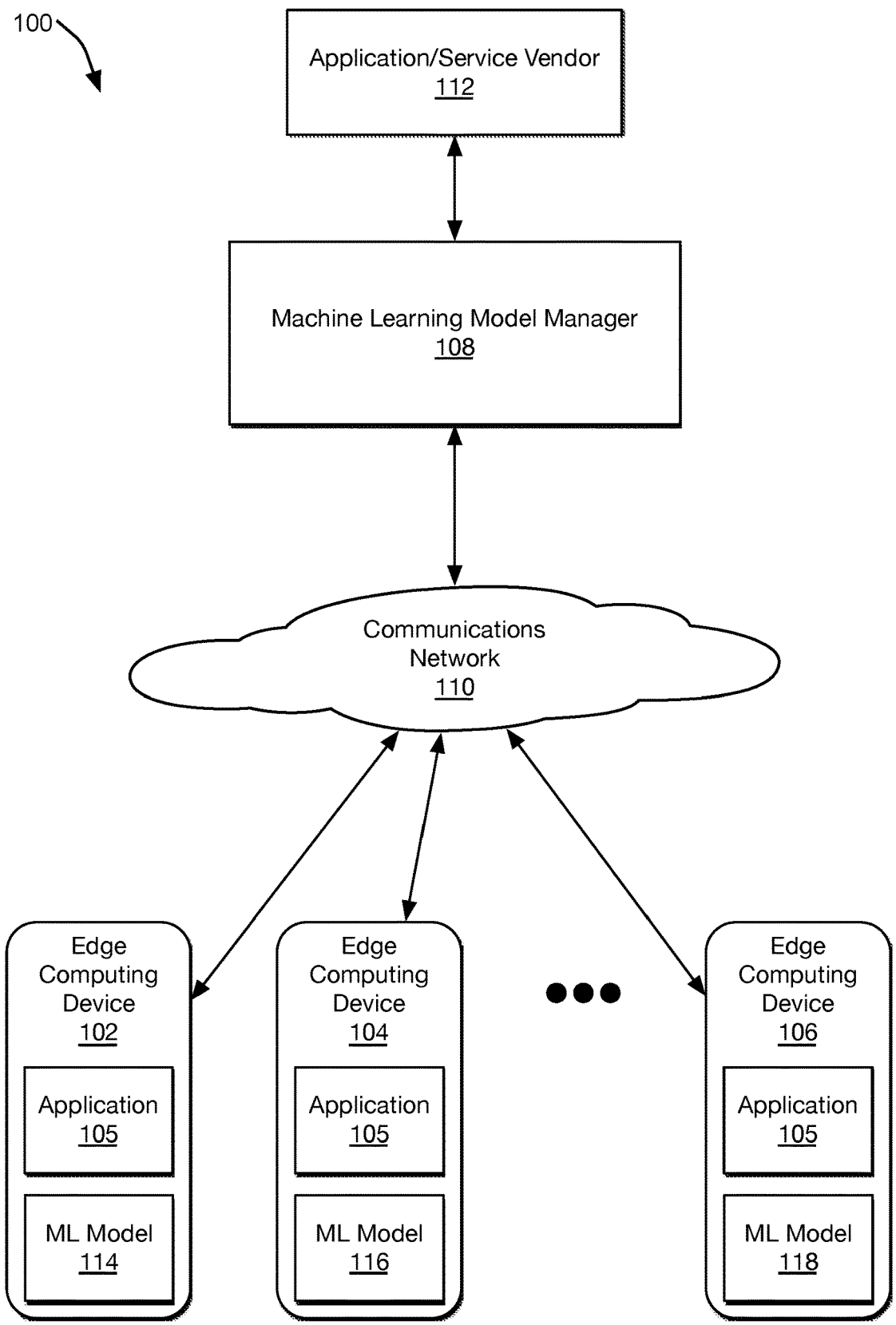
FIG. 1 illustrates an example system for machine learning at edge computing devices based on distributed feedback.

FIG. 1 illustrates an example system 100 for machine learning at edge computing devices 102, 104, and 106 based on distributed feedback. A machine learning (ML) model manager 108 executes as a cloud-based service, although other implementations of an ML model manager 108 can execute in an on-premise server, a private data center, or another computing system that is communicatively coupled to edge computing devices via a communications network 110.

Users of the edge computing devices 102, 104, and 106 can download an instance of an application 105 ("an app") provided by an application/service vendor 112, whether through the ML model manager 108 or independently (e.g., from directly from the vendor or via an app store). The application 105, such as an image recognition application, is developed to use one or more ML models that are managed through the ML model manager 108. For example, in the case of an image recognition application, the app may employ a general image recognition model, specific image recognition models for specific domains (e.g., human faces, vehicle types and license plates, autonomous vehicle environments, security environments, retail items, and biomedical conditions and test results), and/or specific image recognition models for specific sub-domains (e.g., a model for evaluating MRI results, another model for evaluating X-ray results, and yet another model evaluating a patient's emotional and physical responses during hospitalizations).

In some implementations, an application/service vendor 112 trains an initial ML model or set of ML models, such as using a large set of training data (e.g., labeled observations), although some ML models may be completely untrained initially (e.g., unsupervised learning methods). In one implementation, the application/service vendor 112 then logs into the ML model manager 108 through a customer portal or API to register the ML models with the ML model manager 108, uploading the ML models to a model repository managed by the ML model manager 108. An initial ML model or set of ML models may be downloaded by the application 105 or retrieved from the vendor or the ML model manager 108 independently.

In one implementation, the application/service vendor 112 logs into the customer portal or use the API to select from a list of available models provided by the ML model manager 108. For example, the ML model manager 108 can provide a list of models such as, but not limited to, a face recognizer, an image recognition system to identify cars, and a scoring system to label how likely a user is to stop using the app. The application/service vendor 112 can log into the customer portal or use the API to select one of these models to have deployed in the edge computing devices 102, 104, 106 running the application 105.

In another implementation, the application/service vendor 112 logs into a customer web portal or use an API service to modify an ML model provided by the ML model manager 108. For example, the ML model manager 108 provides an ML model that recognizes cars in images, but the application/service vendor 112 wants to only recognize a specific make and model of car. The application/service vendor 112 may use the customer portal or API services to provide additional training data that produces a new (differently trained or re-trained) instance of the ML Model managed by the ML model manager 108 that specifically identifies the vehicle make and model of interest to the application/service vendor 112.

In yet another implementation, the application/service vendor 112 may not be required to configure any aspects of ML models controlled by the ML model manager 108. In such cases, the ML model manager 108 can automatically deploy ML models to the edge computing devices 102, 104, and 106. Those ML model deployments may be determined by a third party (who is not the application/service vendor 112) while accessing the ML model manager 108 via the customer portal or API services and/or may be determined dynamically by the ML model manager 108, such as based on business logic rules and/or machine learning, to control which ML models are deployed to which edge computing devices.

Each edge computing device is loaded with the application 105, which uses one or more ML models (such as ML models 114, 116, and 118). In one implementation, when the application 105 is first invoked or first configured to execute on an edge computing device, the application 105 configures itself with the operating system of the edge computing device to receive push notifications, generating a "push token," which the application 105 uses to register itself with the ML model manager 108. For example, the application 105 can use a device registration API of the ML model manager 108 to submit the push token and device metadata (e.g., device type) to the ML model manager 108. With this information, the ML model manager 108 can register a device profile for the edge computing device, which can be used for training, re-training, and distribution of ML models for the registered edge computing device.

Example device metadata stored in a device profile for the ML model manager 108 may include without limitation:

| Metadata Category | Device Metadata Item | Description |
| --- | --- | --- |
| Device Information | Device_Type, Device_Carrier, Device WiFi Speed (latest/avg/min-max), Device OS Version, Device App/SDK Version | Information about the device that can be automatically discovered from the device |
| Version Information | ML Models | A list of installed ML models and their versions |
| Application Information | Images Uploaded, Bytes sent/received, SDK calls executed, Feedback submitted | Application-specific parameters (including user-defined parameters) that change because of application usage |
| User Information | User identifier (e.g., a GUID), Audience Segment, Tag, Subscriptions, Customer Defined, Privacy Settings | Includes a way to uniquely identify a user, such as a GUID. Audience segments contain information on how this user is related to other similar users in the device network. Tags provide a way to label a user with any properties that may be provided by any combination of tags defined by the app, |

| Metadata Category | Device Metadata Item | Description |
|---|---|---|
| | | by the vendor, or by machine learning models run either in the cloud or on the edge computing device. A customer may be able to self-select into an audience segment or a tag level through an application interface on the device. Privacy settings configurable by a user may be applied as metadata to provide the app knowledge of what data may be collected and how it may be used. For example, a user may decide to opt-in to data collection for personalization of in-app experience but not for targeted advertising. Those selections may be tracked and provided as metadata for use. |

In application executions that occur after the registration, subsequent registration operations are generally not required, although updates to the device profile stored by the ML model manager 108 may be made (e.g., an updated set of ML models and version). Furthermore, the accuracy of the original registration data may be confirmed. If there is an inaccuracy detected, restoration of the device profile from a back-up or a re-registration operation may be triggered.

Each instance of the application 105 can request an ML model package containing the ML model(s) and associated metadata appropriate for the application 105, the device, and/or the user. Alternatively, the ML model manager 108 can send new ML model packages for the application 105 to appropriate devices and/or uses as part of a maintenance update. In one implementation, all devices and users of the application 105 may receive the same set of one or more ML models. Alternatively, devices and/or users in different audience segments may receive different sets of one or more ML models. Audience segmentation may be manually defined by the vendor through a user interface or API to the ML model manager 108; automatically defined by the ML model manager 108 based on edge computing device criteria, user behavior and characteristics, and other factors; defined by the edge computing device based on similar factors; or defined by a combination of these facilities. In yet other scenarios, all devices and/or users of the application 105 may receive a unique set of one or more ML models.

Accordingly, each edge computing device is configured to execute an application that uses one or more ML models (such as ML models 114, 116, and 118) managed by the ML model manager 108. Each ML model is generally executed in combination with an associated application, although in some implementations, an ML model may support multiple applications. For example, an X-ray analysis application can input one or more X-ray images of a patient, input the images to one or more ML models, and output a diagnosis result, such as a determination and/or confidence level that a tumor is present in the images. In this context, the X-ray images input to the ML model(s) represent unlabeled observations captured by an X-ray sensor communicatively coupled to the edge computing device, and the diagnosis result represents a label that the ML model has associated with the previously unlabeled observations.

The result can thereafter be filtered (e.g., approved/disapproved) by a human expert or another expert agent, if appropriate. As such, if the diagnosis result is approved or corrected by the human expert, the image result pair remains a valid labeled observation output from the ML model(s) and the application 105. On the other hand, if the result is disapproved by the human expert, the output image-result pairing is ignored and/or corrected by the human expert.

Accordingly, through execution of the applications and the ML models on multiple edge computing devices 102, 104, and 106, additional labeled observations may be developed by each of the edge computing devices and fed back to the ML model manager 108 via the communications network 110. Using these new labeled observations, the ML model manager 108 can re-train (e.g., overwrite or update the training of) the one or more ML models provided to the applications at the edge computing devices 102, 104, and 106. Based on policies and/or user or vendor instructions, the re-trained ML models can be re-deployed out to the edge computing device 102, 104, and 106 in an effort to improve application execution results, efficiency, etc. The previous set of ML models on an edge computing device are replaced with the corresponding updated set of new ML models for use by the application 105 on the edge computing device. Such re-training, re-deployment, execution, and feedback can repeat over time during the lifecycle of the application 105.

Moreover, as discussed later, the re-training, re-deployment, and feedback can be segmented across the edge computing devices that execute a corresponding application, such that different audience segments of users and/or edge computing devices are executing differently re-trained ML models. In this manner, the users and/or edge computing devices can execute ML models for which the re-training has been targeted for a particular audience of edge computing devices and/or users. Different audience segments can be identified by a unique segment identifier, such as a GUID or other unique or multicast transmission scheme. Such segmentation may also be specified and applied by the application itself. For example, ML models for image processing of structural defects in bridges may be segmented from ML models for image processing of structural defects in building foundations. Accordingly, in this example, the user may designate through the application the different domain spaces as different segments (e.g., bridges vs. building foundations), and the machine learning model manager 108 can enforce that segmentation during the re-training, re-deployment, and feedback phases.

Furthermore, by using a multicast transmission (e.g., using multicast addressing) scheme, the system can allow users/devices to self-identify as a member of a particular audience segment without submitting personally identifying information (PII) or another user/device identifying information to the ML model manager 108. As such, audience segmentation can be accomplished while maintaining privacy for users and edge computing devices.

Figure 2:
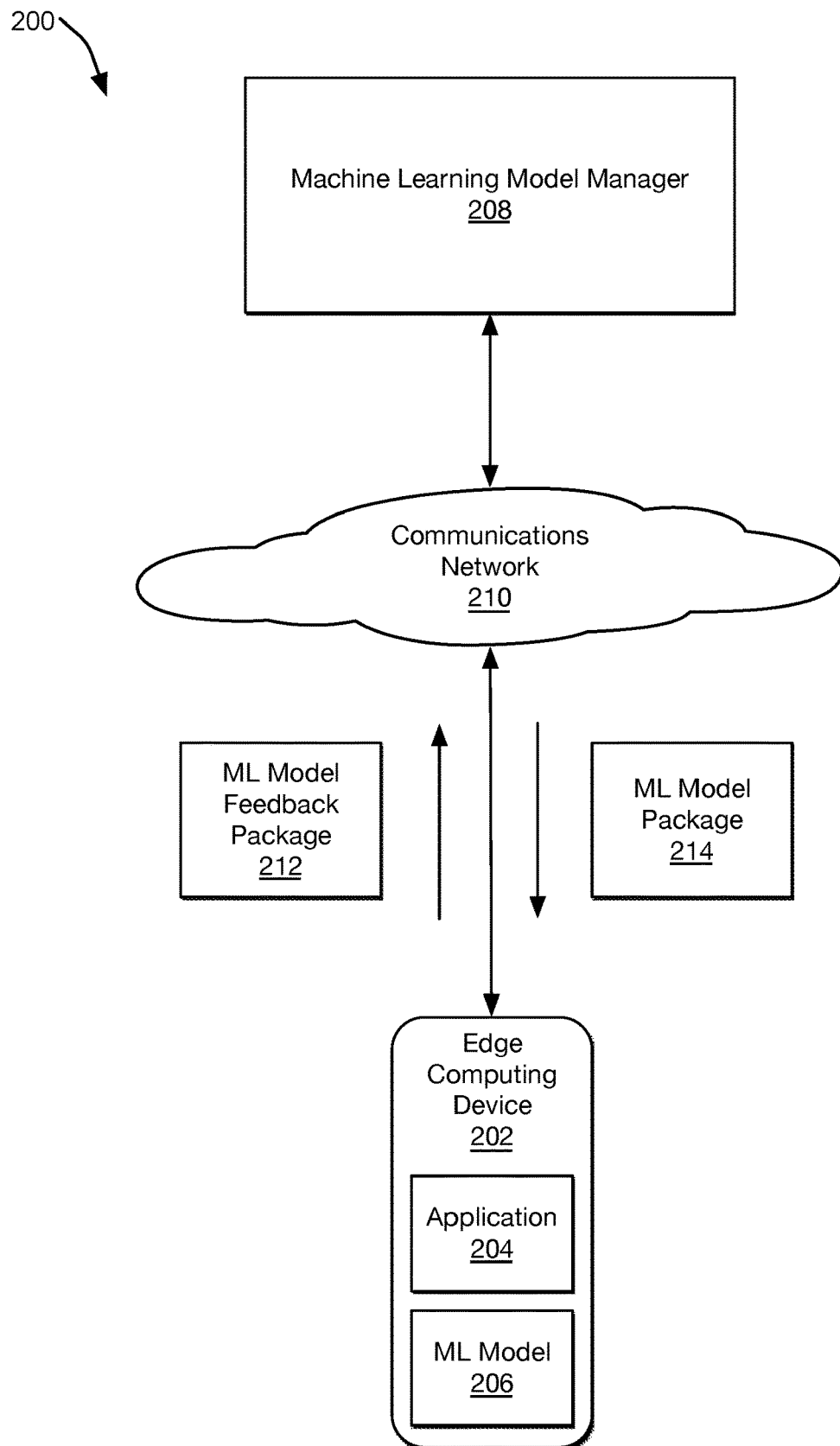
FIG. 2 illustrates an example system for distributing machine learning models and collecting machine learning model feedback.

FIG. 2 illustrates an example system 200 for distributing machine learning models and collecting machine learning model feedback. A machine learning (ML) model manager 208 executes as a cloud-based service, although other implementations of an ML model manager 208 can execute in an on-premise server, a private data center, or another computing system that is communicatively coupled to edge computing devices via a communications network 210. A user of an edge computing device 202 can download an application 204 ("app") provided by an application/service vendor, whether through the ML model manager 208 or independently (e.g., from directly from the vendor or via an app store). The edge computing device 202 executes the application 204 in combination with an ML model 206, which initially can be downloaded from the ML model manager 208 or independently (e.g., from directly from the vendor or via an app store). It should be understood that the application 204 and the ML model 206 may be separate software components or integrated into a single software component.

As the application 204 and the ML model 206 execute on the edge computing device 202, the ML model 206 (sometimes in combination with the application 204 itself) generates additional labeled observations (e.g., predictive results) from the input data (e.g., X-ray images) provided to the application 204. The labels may include one or more of the following: a predictive result of the ML model 206 execution (e.g., identification of features in an X-ray image), a confidence score associated with the result, a replacement label provided by the user or another process (e.g., through the application 204). As the application 204 collects new labeled observations resulting from or associated with the execution of the ML model 206, the application 204 prepares an ML model feedback package 212 for submission through the communications network 210 to the ML model manager 208.

The contents of the ML model feedback package 212 can vary according to the vendor's instructions or policies and/or the segmentation of the ML models. In one implementation, the ML model feedback package 212 includes a filtered or unfiltered set of the new labeled observations resulting from or associated with the execution of the ML model 206. In another implementation, such as when the edge computing device 202 performs some re-training of its own on the ML model 206, the ML model feedback package may also or alternatively include a re-trained instance of the ML model 206. In yet another implementation, one or more of the preceding package components may be combined with a confidence score associated with each ML model-generated result and/or a performance score associated with the ML model 206 (e.g., as compared to user or expert review results).

In one implementation, example ML model feedback data package 212 may include one or more of the following without limitation:
 A project ID identifying the project to which the observation (whether labeled or unlabeled) belongs
 An ML model manager-issued GUID identifying the edge computing device submitting the feedback data
 One or more time-stamps indicating when the observation data in the feedback data package was captured
 Raw captured data/observations (e.g., X-ray images)

In some implementations, the ML model feedback data package 212 may also include correction data, which can be generated when an ML model predicts a certain result, but a human expert or other expert agent disagrees with and corrects the prediction. Example correction data may include one or more of the following without limitation:
 A dataset asset ID of the existing observations
 An ML model type marker and/or version
 The prediction result generated by the ML model
 The corrected prediction result provided by the human expert or another expert agent The ML model manager 208 can use this feedback information in the ML model feedback package 212 in a variety of ways. new labeled observations and corrections can be used to re-train the associated ML model. In some implementations, an ML model can be re-trained using new labeled observations and corrections received as feedback data from one or more edge computing devices, depending on policies or instructions specified by the vendor and/or the user.

The ML model manager 208 can perform the re-training in a variety of ways, including without limitation one or more of the following techniques:
 Identifying mislabeled observations
 Adding new labeled observations to increase the generalization of the re-trained ML model
 Quantifying the performance of an ML model and determining when re-training is necessary based on the performance metric of the model dropping over time. A change (e.g., a drop) in performance over time may be measured by seeing a change (e.g., an increase) in the number of mislabeled observations. A drop in performance may trigger re-training the ML model and/or re-tuning the hyperparameters of a model.
 Correlating vendor key performance indicators to ML model performance to quantify business profitability If the edge computing device 202 is performing some of its own re-training and the feeding the re-trained ML model back to the ML model manager 208, then the ML model manager 208 can replace the corresponding ML model in its ML model repository or evaluate the performance score of the re-trained ML model against the performance scores of other ML models, decide which ML model performs best in various context and/or segments, and store/deploy these best-performing ML models accordingly.

Deployment of re-trained ML models is generally performed by the ML model manager 208 in the form of an ML model package 214, although the ML model manager 208 may also handle the initial deployment of appropriate ML models to corresponding applications as well. The ML model package 214 can include one or more ML models.

In one implementation, the ML model manager 208 inputs the re-trained ML model(s) into an ML model package and transmits them to all edge computing devices executing the application 204. In another implementation, each ML model is associated with one or more audience segments, so the ML model manager 208 identifies the ML model(s) associated with each audience segment and allocates those ML model(s) to the corresponding edge computing devices in those audience segments. In yet other implementations, some audience segments are narrowed to a single user or a single edge computing device, in which case the ML model manager 208 identifiers the ML model(s) associated with each user or edge computing device and deploys those ML model(s) to the corresponding edge computing device.

Figure 3:
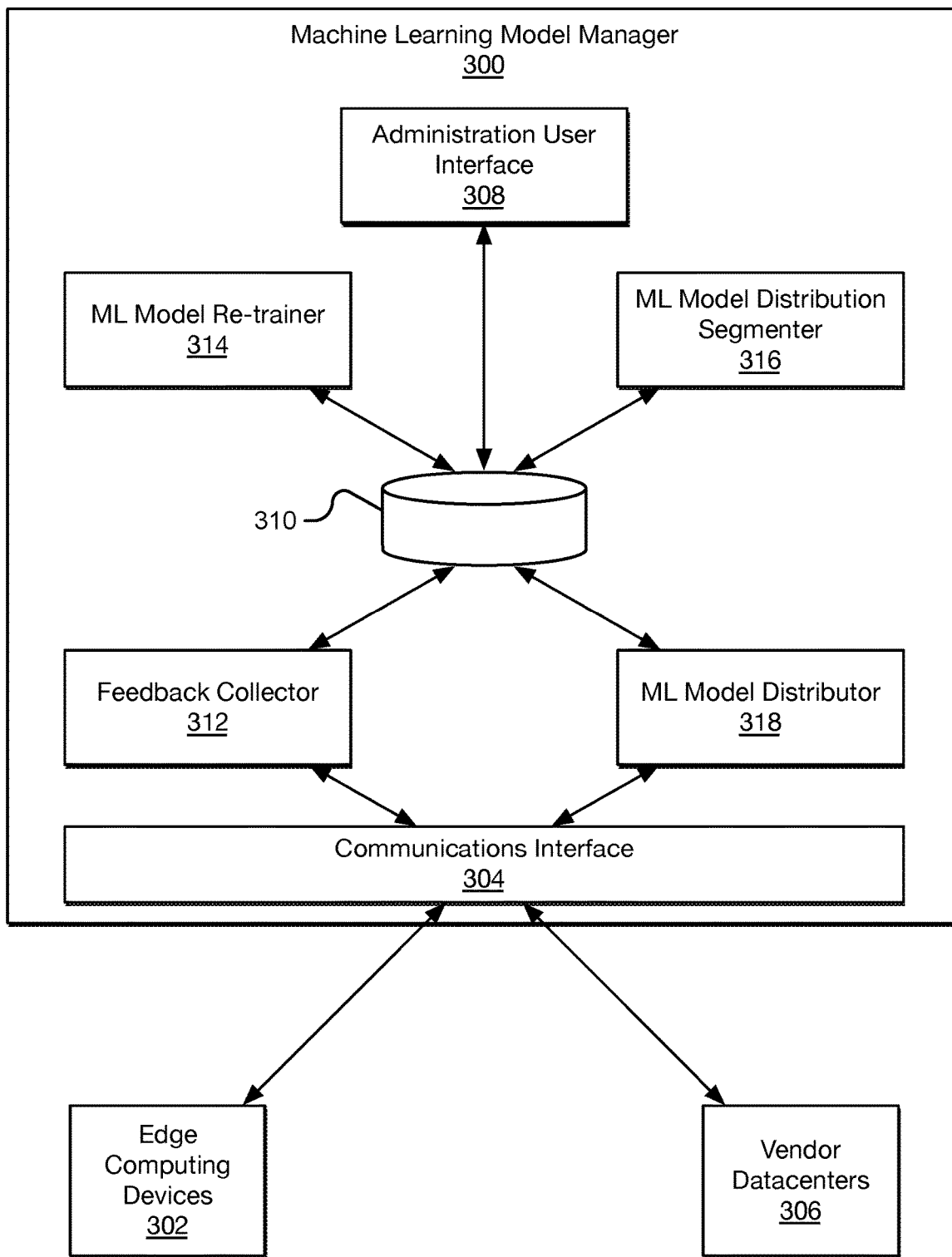
FIG. 3 illustrates an example machine learning model manager 300 providing machine learning model re-training based on distributed feedback.

FIG. 3 illustrates an example machine learning model manager 300 providing machine learning model re-training based on distributed feedback. The ML model manager 300 communicates through a communications interface 304 with one or more edge computing devices 302 across a communications network (not shown). The edge computing devices 302 provide feedback data including labeled observations generated by the execution of trained instances of machine learning models at the edge computing devices 302 on unlabeled observations captured by the edge computing devices 302. The ML model manager 300 re-trains one or more ML models and re-deploys them among the edge computing device 302 or a subset thereof.

The ML model manager 300 also communicates through a communications interface 304 with one or more vendor datacenters 306 across a communications network (not shown). A vendor can access an administration user interface 308 and upload one or more ML models (trained or untrained), initial training data, model parameters and hyperparameters, supplemental training data, ML model re-training policies (e.g., frequency), input specifications and shapes for submitted ML models, and other data. The ML model manager 300 stores the uploaded data to an ML model repository 310. The vendor can also access the administration user interface 308 to obtain ML model feedback data (including model performance data), training and re-training statistics, edge computing data, aggregated user data, and other ML model-related information. The ML model manager 300 also stores the ML model feedback data to the ML model repository 310.

The ML model manager 300 manages ML model re-training and deployment on an iterative basis. This description will start with the receipt of ML model feedback data from the edge computing devices 302, although this should not be interpreted to require that the receipt of the ML model feedback data is necessarily the first operation in the re-training and deployment loop.

A feedback collector 312 of the ML model manager 300 receives ML model feedback data (e.g., in an ML model feedback package) from an edge computing device 302 via the communications interface 304 and processes the ML model feedback data, saving it to the ML model repository 310. Example processing may include without limitation allocating the ML model feedback data according to designated audience segments and making the ML model feedback data available to the vendors, if this option is allowed by policy. It should be understood that receipt of ML model feedback data may be continuous, periodic, ad hoc, on-demand, triggered by events at or requests from the edge computing devices, etc.

An ML model re-trainer 314 accesses the ML model repository 310 to extract re-training data and associated ML models and to perform the re-training of these ML models using the re-training data. The re-training data and ML models may be segmented by existing or new audience segments. The re-training of an ML model can involve inputting new labeled observations from the feedback data to the ML model and/or comparing performance (e.g., accuracy, precision, F1-score, click-through rates) of the pre- and post-re-training instances of the ML model to determine which instance is best for use by associated edge computing devices. Multiple re-trained ML model instances may be generated and compared to the pre-re-training instance by varying the set of feedback data used to re-train each instance. The ML model re-trainer 314 stores the re-trained instance(s) of the ML model to the ML model repository 310. In one implementation, ML models are encapsulated in a ".h5" file according to the Hierarchical Data Format (HDF) that supports n-dimensional data sets of complex objects, although other formats may be employed. It should be understood that re-training of ML models may be continuous, periodic, ad hoc, on-demand, triggered by events at or requests from the edge computing devices, etc.

For each trained and re-trained instance of an ML model, the ML model repository stores ML model metadata. Example of ML model metadata may include, without limitation, the following:

| Metadata Category | Metadata Element Name | Description |
|---|---|---|
| Model Architecture | Model category, model type, hyperparameters, input_shape | The model category may include categories such as linear or non-linear, supervised or unsupervised learning, etc. Model type may specifically identify the model, such as a decision tree, linear regression, K nearest neighbors, CNN, etc. Hyper parameters are specific to each model and cover the parameters a particular model allows to be configured. The input_shape defines the specific inputs that define the features that the model expects as input. |
| Training | Framework, start_datetime, end_datetime, duration_secs, training_metrics, training_dataset_size, training_batches, validation_metrics, validation_dataset_size, validation_batches, validation_split, test_metrics, test-dataset_size, total_dataset_size | Key attributes about the training process that can be used to inform how the model was generated including training time, data used in the training process, how the data was split into validation sets |
| Additional Metadata | Customer Defined | Additional user supplied metadata |

An ML model distribution segmenter 316 updates the audience segmentation of the ML models in the ML model repository 310. Such segmentation updates may be based on a variety of factors, including without limitation segmentation instructions or policies from a vendor, changes in the edge computing device profile, changes in user behavior or profile, model performance analysis and comparisons among different audience segments, etc.

Based on the updated audience segmentation applied to the ML models in the ML model repository 310, an ML model distributor 318 extracts the appropriate ML models and associated metadata from the ML model repository 310 and converts the ML models into an appropriate format (e.g., a CoreML ".mlmodel" file format) for distribution. The ML model distributor 318 transmits one or more sets of reformatted ML models to the edge computing device 302 through the communications interface 304. The edge computing devices 302 then processes the received ML models and inputs them for use by the associated application, sometimes subject to certain testing operations. It should be understood that segmentation and/or distribution of ML models may be continuous, periodic, ad hoc, on-demand, triggered by events at or requests from the edge computing devices, etc.

Figure 4:
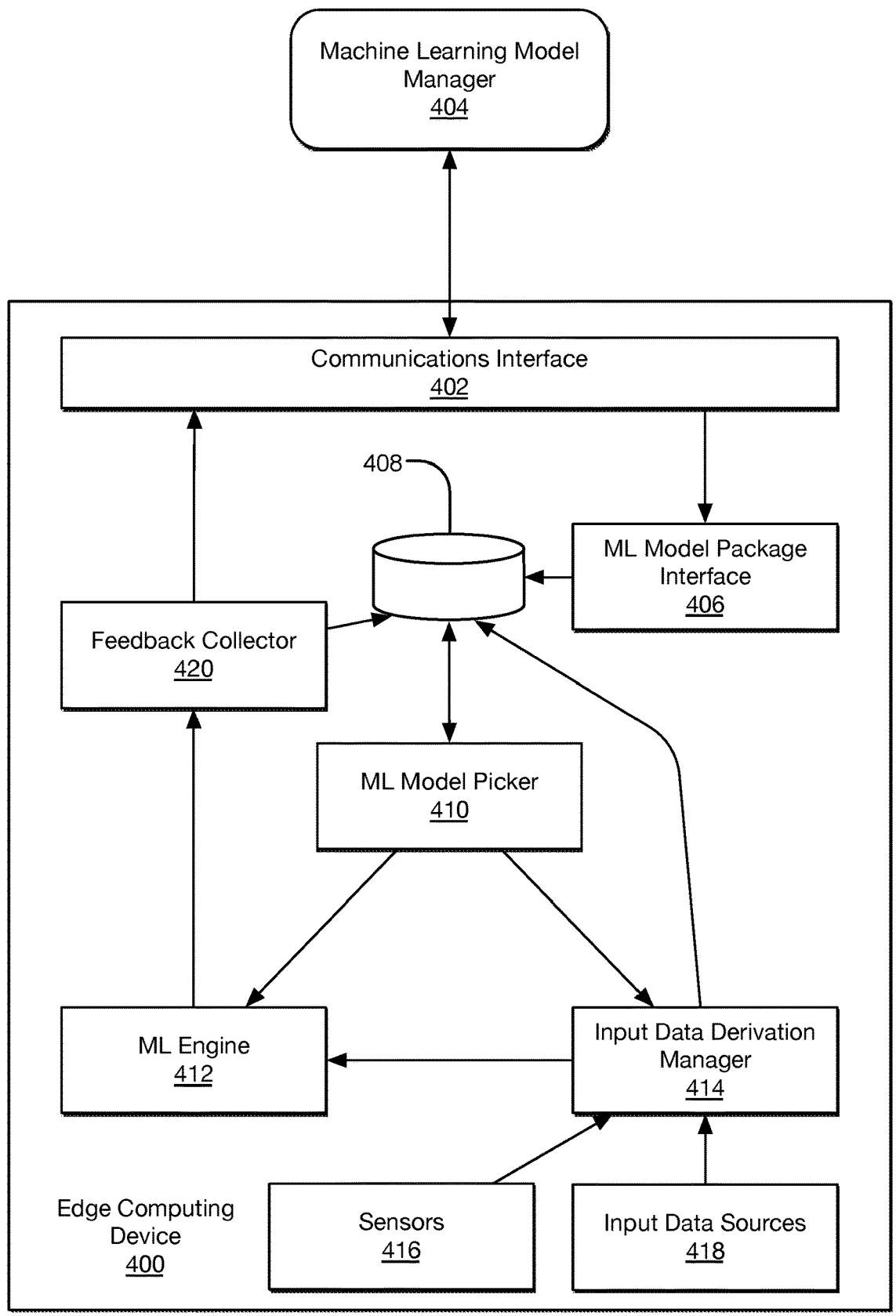
FIG. 4 illustrates an example edge computing device providing machine learning based on distributed feedback.

FIG. 4 illustrates an example edge computing device 400 providing machine learning based on distributed feedback. The edge computing device 400 communicates through a communications interface 402 with an ML model manager 404 across a communications network (not shown). An ML model package interface 406 receives an ML model package and stores the one or more ML models and any associated metadata contained therein to an ML model repository 408. The ML model package interface 406 may also prepare the ML model(s) for use by the resident application, such as by compiling the ML model using a CoreML "compileModel" method or some other compilation operation. If the compilation was successful, the compiled ML models are saved to the ML model repository 408.

An ML model picker 410 extracts one or more compiled ML models from the ML model repository 408 and tests each model to confirm that it is both operational and producing prediction results. In one implementation, the ML model picker 410 uses sample data (e.g., pre-provided with the application or ML model, requested from the ML model manager 404 or labeled observations from new data captured by the edge computing device 400). The ML model picker 410 compares the results of the tested model prediction to the known labels. If the associated performance metric (e.g., accuracy, click-through, F1 score, precision) demonstrated by the test satisfies a model acceptance condition (e.g., demonstrating an accuracy that exceeds a predetermined threshold or an accuracy that is more accurate than other ML models—"winner selection"), then the ML model picker 410 can replace the previous instance of the ML model with the newly compiled and tested instance of the re-trained ML model. Test results can also be communicated to the ML model manager 404 as feedback data for performance tracking, segmentation, and re-training purposes.

The metadata associated with each ML model may contain one or both of an input shape parameter and an input specification parameter. The input shape parameter defines the acceptable input elements and optionally their respective limits for the ML model. As such, the input shape parameter can be used to narrow the input provided to the ML model, omitting unnecessarily high degrees of input dimensionality that can lead to ML model inaccuracies.

In addition to the input shape parameter, the metadata associated with each ML model may also include an input specification parameter that defines derivations of raw observation data to predefined types of derived input data that is supplied to the ML model instead of or in addition to the raw observation data. For example, if the raw observation data is in the form of high-resolution images, the derived input data defined by the input specification parameter may be in the form of feature vectors extracted from the raw image data. In addition to reducing the complexity of input provided to the ML model, such derivation can enforce anonymity and maintain privacy constraints—e.g., the derived input data may be included in the feedback data provided to the ML model manager 404. For example, via generation of derived input from captured data, an edge computing device can filter out personally-identifiable information (PII) and other sensitive data from the labeled observations included in feedback data, enhancing the privacy protection effectiveness of the system. The input specification may include declarative or programmatic instructions for derivation, links to executable library routines for derivation, other ML models from the ML model repository 408, or some other derivation-capable functionality.

Both input shape and input specification can be specified by the vendor through a user interface or API of the ML model manager 404, provided directly to the edge computing device 400 by the vendor, automatically generated by the ML model manager 404 and/or the edge computing device based on performance and re-training results, or some combination of these or other techniques. Moreover, input shapes and specifications can vary among different audience segments. As an example of input shape and input specification definition via the ML model manager 404, a vendor could specify a set of acceptable inputs and derivations for a given ML model. Additionally, based on performance testing and re-training iterations, the ML model manager 404 may identify adjustments to the inputs and derivations that improves the performance of the ML model, updating the input shape and input specification accordingly before transmitting with the ML model to one or more edge computing devices. Other criteria that may be considered in defining the input shape and input specification parameters may include without limitation how much the ML model is used by the edge computing device, whether and/or how much the user is paying for the ML model, and edge computing device resources (e.g., processor speed, memory, communications bandwidth, input data capture capabilities).

The edge computing device 400 may also identify adjustments to the input shape and/or input specification for a given ML model. For example, the edge computing device may be upgraded with a new derivation library or new sensors that provide new options for input data to the ML model. Accordingly, the edge computing device 400 may adjust the input shape and/or input specification to accommodate these upgrades. Such adjustments may depend on a test that determines that the adjustment can result in improved ML model performance. In yet another implementation, the use of different input shapes and/or input specifications may depend on current or historical device operation, user behavior, or observation capture capability. For example, if the sensors on the device are limited to video capture functionality (e.g., no audio capture is available), then the input specification derivations that include audio capture may be omitted or ignored.

In some implementations, each edge computing device can create its own input specification based on available capture interfaces, such as sensors and communications interfaces. For example, an input data derivation manager of an edge computing device can automatically generate an input specification based on derivation programming code provided with the application and on the capture interfaces that are operational on the edge computing device. The input data derivation manager of an edge computing device may also be configured to adjust the input specification and/or the derivation programming code that is associated with a particular ML model, such as based on scored ML model performance. For example, the input data derivation manager of the edge computing device can monitor performance metrics from execution of the ML model and optimize or otherwise adjust the input specification to improve the performance metrics (e.g., accuracy, click-through, F1 score, precision) of the ML model results. Furthermore, additional derivation programming code can be updated on the edge computing device by the vendor or ML model manager to further adjust the input specification for a particular ML model.

In some implementations, the edge computing device 400 may find a conflict among multiple ML models, input shape parameters, and input specifications stored in the ML model repository 408. The edge computing device 400 may resolve such conflicts using predefined conflict resolution policies (e.g., use the most recent model and/or parameters) or defer to the ML model manager 404 to resolve such conflicts.

When an ML engine 412 in the edge computing device 400 requests execution of an ML model from the ML model picker 410, the ML model picker 410 extracts the appropriate ML model and associated metadata from the ML model repository 408, sending the ML model to the ML engine 412 for execution and the input shape and input specification parameters to an input data derivation manager 414 for application to the captured input data captured by sensors 416 and other input data sources 418. In another implementation, a data capture device (e.g., sensors 416 and other input data sources 418) may be external to the edge computing device 400 and send sensor data to the edge computing device via a communication network. An exemplary capture device setup may be a camera or microphone that is connected to the device via Bluetooth communications or a USB cable. Raw captured input data and the derived input data can also be stored in the ML model repository 408, and later associated with prediction results and expert input (as labels). In another implementation, raw captured input data and derived input data may be stored in another local or remote storage location on the device that is not part of the ML model repository 408, and the ML engine 412 and/or the input data derivation manager 414 would have access to the storage location.

The input data, typically in the form of unlabeled observations (e.g., images, video clips, audio clips, biomedical test results, feature vectors, derived input data), whether raw or derived, are input to the ML engine 412 for processing by the ML model(s) loaded therein. The ML engine 412 generates labeled observations by the execution of a trained instance of one or more ML models on the edge computing device 400 on the unlabeled observations captured by the edge computing device 400 or otherwise derived from raw unlabeled observations. The ML engine 412 can also generate confidence scores based on the execution of the ML model(s) and/or performance scores based on user or expert agent review of the prediction results.

The ML engine 412 can present its prediction results to the user via a user interface (not shown), and in some implementations, the user or another expert agent can accept, correct, or otherwise adjust the prediction results. One or more of the prediction results (accepted, corrected, or otherwise), the executed ML model(s), confidence scores, performance scores, and other feedback data can be submitted to a feedback collector 420 for communication to the ML model manager 404 through the communications interface 402. The feedback collector 420 may also store some or all of the feedback data to the ML model repository 408, such as for coupling with captured observations and/or derived input data to yield new labeled observations that are stored locally on the edge computing device 400.

Figure 5:
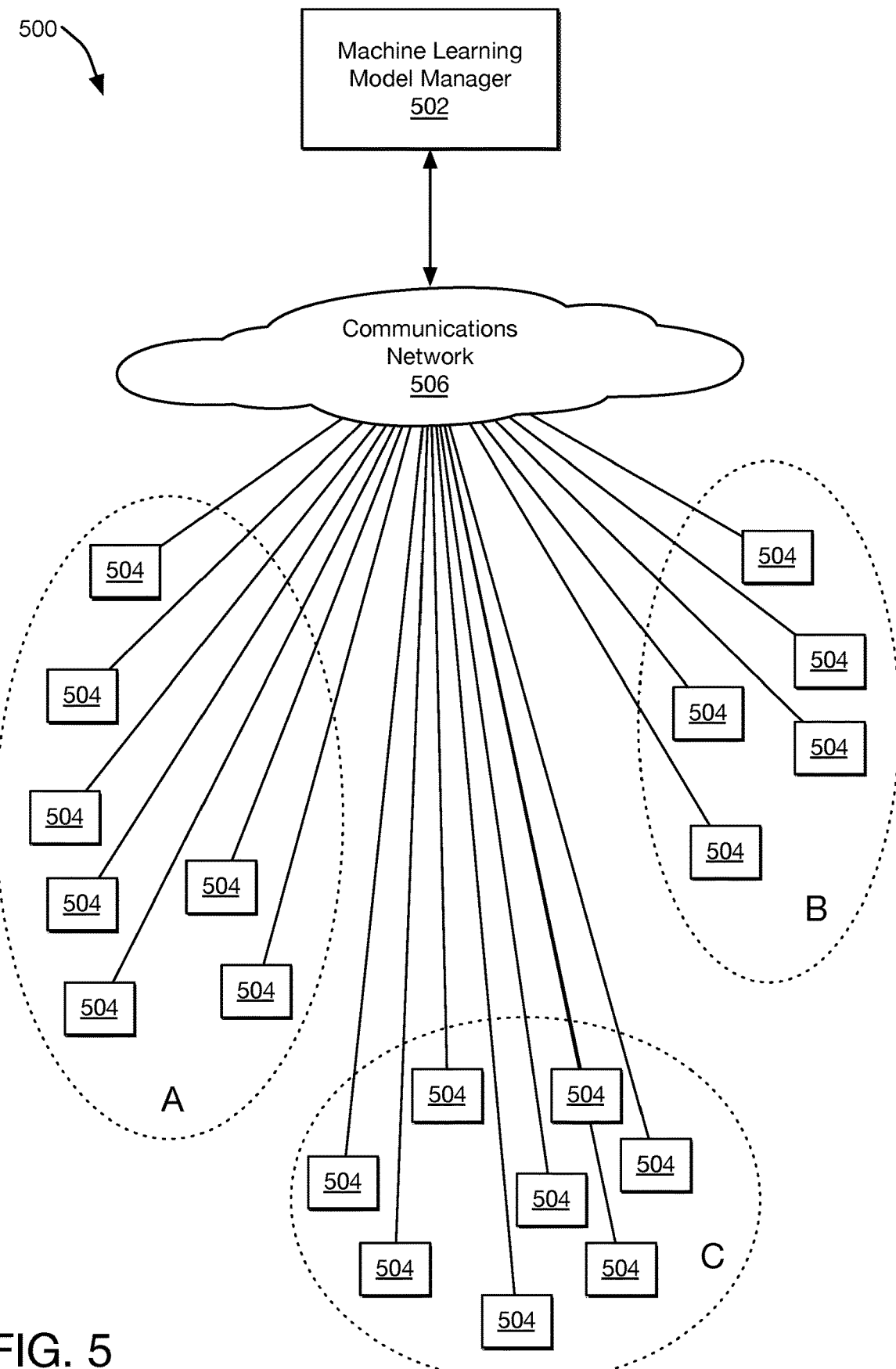
FIG. 5 illustrates an example system for providing machine learning at edge computing devices based on distributed feedback and audience segmentation.

FIG. 5 illustrates an example system 500 for providing machine learning at edge computing devices based on distributed feedback and audience segmentation. An ML model manager 502 communicates through a communications interface with one or more edge computing devices 504 across a communications network 506. Each edge computing device 504 is shown as being a member of an audience segment A, B or C. Each audience segment includes edge computing devices that satisfy an audience segment condition defined by the vendor of the associated application, by the ML model manager 502, by processes on the edge computing devices 504, or a combination thereof. For example, the audience segments A, B, and C may be defined by settings in the application executing on each edge computing device—segment A has an image recognition application set to recognize human faces, segment B has the image recognition application set to recognize bridge structural defects, and segment C has the image recognition application set to recognize text (e.g., optical character recognition). In some implementations, one or more audience segments may include only a single edge computing device. Other criteria may be used to define audience segments including without limitation user behavior, edge computing device capabilities, application version, geographical location, subscription status of the users, and other criteria.

The ML model manager 502 can determine which ML models and metadata to distribute to which edge computing devices based on the defined audience segments. In one implementation, the ML model manager 502 tracks the devices profiles of each edge computing device and the metadata of each ML model and associates both devices and models to individual audience segments, which guides the deployment of ML models to the edge computing devices 504 by the ML model manager 502. Audience segments, their member devices, and their associated ML models may change over time as contexts change. It should be understood that input shapes, input specifications, and other metadata, as well as feedback data, may also be segmented according to audience segments.

Figure 6:
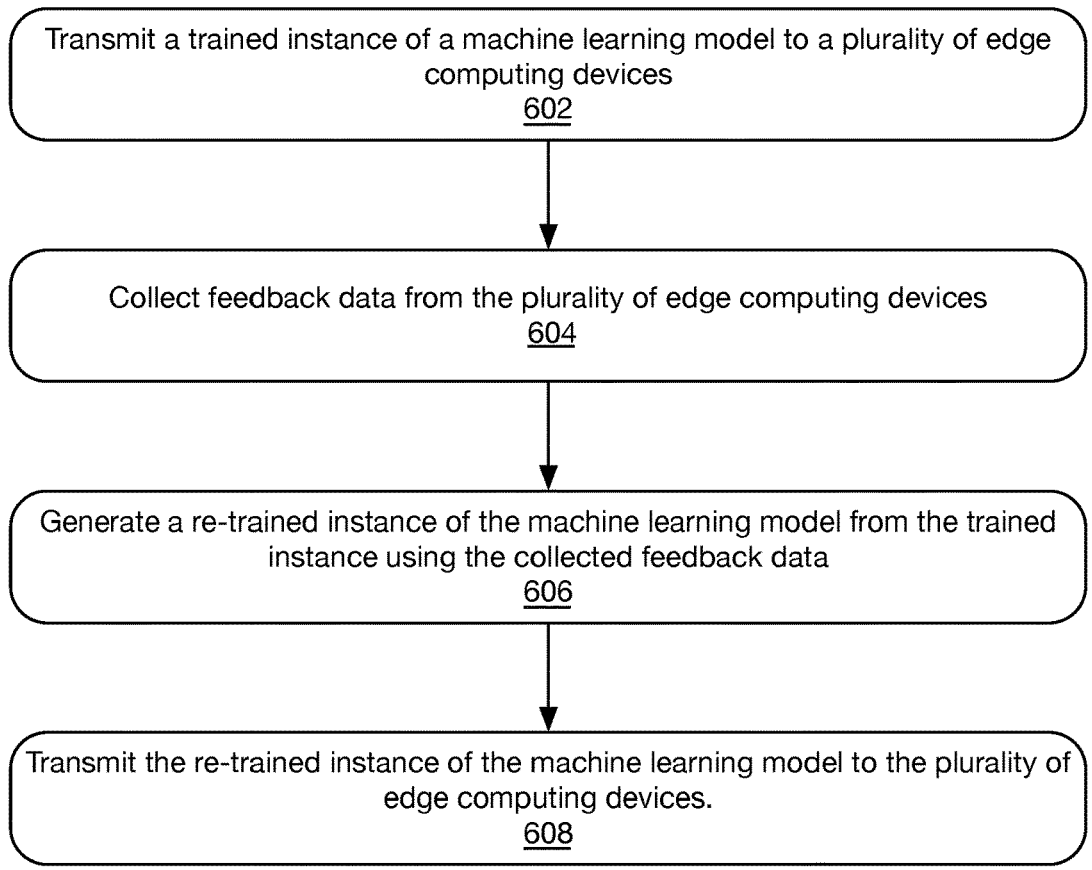
FIG. 6 illustrates example operations for executing a machine learning model manager providing machine learning model re-training based on distributed feedback.

FIG. 6 illustrates example operations 600 for executing a machine learning model manager providing machine learning model re-training based on distributed feedback. A transmitting operation 602 transmits, via one or more communications networks, a trained instance of a machine learning model to a plurality of edge computing devices. A collecting operation 604 collects, via the one or more communications networks, feedback data from the plurality of edge computing devices. The feedback data may include labeled observations generated by the execution of the trained instance of the machine learning model at the plurality of edge computing devices on unlabeled observations captured by the plurality of edge computing devices. A generating operation 606 generates a re-trained instance of the machine learning model from the trained instance using the collected feedback data. Another transmitting operation 608 transmits, via the one or more communications networks, the re-trained instance of the machine learning model to the plurality of edge computing devices.

Figure 7:
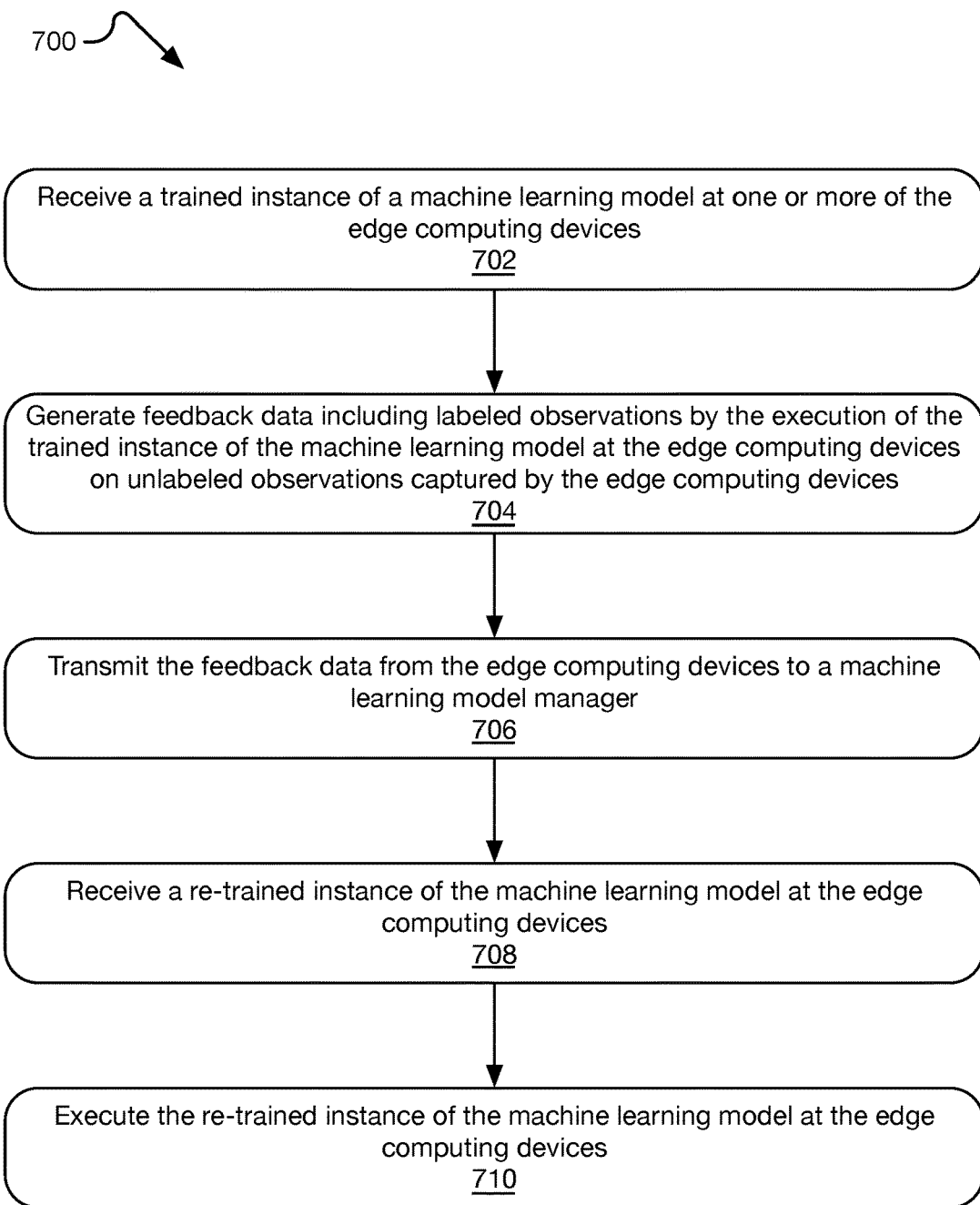
FIG. 7 illustrates example operations for executing machine learning at edge computing devices based on distributed feedback.

FIG. 7 illustrates example operations 700 for executing machine learning at edge computing devices based on distributed feedback received from the edge computing devices. A receiving operation 702 receives, via one or more communications networks from a machine learning model manager, a trained instance of a machine learning model at one or more of the edge computing devices. A generating operation 7041 generates feedback data including labeled observations by the execution of the trained instance of the machine learning model at the one or more of the edge computing devices on unlabeled observations captured by the one or more of the edge computing devices. A transmitting operation 706 transmits, via the one or more communications networks, the feedback data from the one or more of the edge computing devices to a machine learning model manager A receiving operation 708 receives, via the one or more communications networks from the machine learning model manager, a re-trained instance of the machine learning model at the one or more of the edge computing devices, the re-trained instance of the machine learning model being generated from the trained instance using the collected feedback data. A machine learning operation 710 executes the re-trained instance of the machine learning model at the one or more of the edge computing devices.

Figure 8:
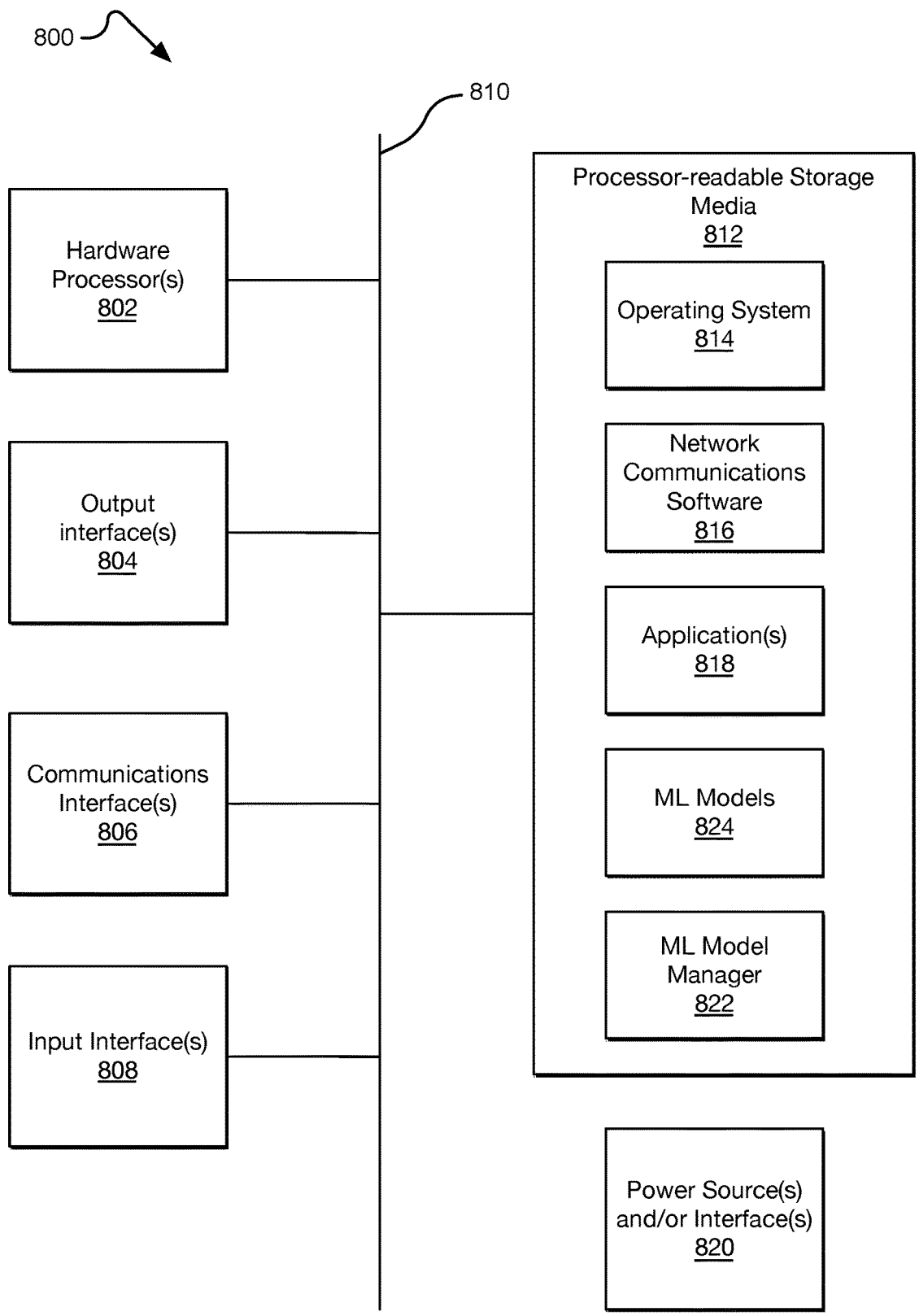
FIG. 8 illustrates an exemplary computing device for implementing the features and operations of the described technology.

FIG. 8 illustrates an exemplary computing device 800 for implementing the features and operations of the described technology. Other computing device architectures are possible, including architectures with more or fewer components. In some implementations, the computing device 800 includes one or more hardware processors 802 (e.g., Intel multicore 64-bit processors, Advanced RISC Machine processors), one or more output interfaces 804 (e.g., a LCD or LED display), one or more communications interfaces 806 (e.g., a wireless communications interface, an Ethernet adapter), one or more input interfaces 808 (e.g., mouse, keyboard, touch-sensitive display) and one or more processor-readable storage media 812 (e.g., RAM, ROM, SDRAM, SSD, hard disk, optical disk, flash memory, etc.). These components can exchange communications and data over one or more communication channels 810 (e.g., buses), which can utilize various hardware and software for facilitating the transfer of data and control signals between components.

The term "processor-readable storage medium" refers to a storage medium that from which instructions can be read by a processor-based system or computer and participates in providing instructions to the hardware processors 802 for execution, including without limitation, non-volatile media (e.g., optical, solid state, or magnetic disks), volatile media (e.g., memory) and transmission media. Transmission media includes, without limitation, coaxial cables, copper wire, and fiber optics. The term "processor-readable storage medium" also excludes transitory signals.

Processor-readable storage media 812 can further include operating system 814 (e.g., a Microsoft Windows operating system, a MacOS or iOS operating system, an Android operation system, a Linux operating system), one or more network communications software 816, one or more applications 818, an ML model manager 822, a machine learning engine, and other processor-executable modules. The operating system 814 can be multi-user, multiprocessing, multitasking, multithreading, real-time, etc. The operating system 814 performs basic tasks, including but not limited to: recognizing input from the input interfaces 808, receiving input and providing output to the communications interfaces 806, and providing output to the output interfaces 804; keeping track and managing files and directories on processor-readable storage media 812 (e.g., memory or a storage device); controlling peripheral devices; and managing traffic on the one or more communication channels 810. The network communications software 816 includes various components for establishing and maintaining network connections (e.g., software for implementing communication protocols, such as TCP/IP, HTTP, etc.). The processor-readable storage media 812 can also store ML models 824 and other data.

The computing device 800 can be implemented in a parallel processing or peer-to-peer infrastructure or on a single device with one or more processors. Software can include multiple software components or can be a single body of code. One or more power sources and/or power interfaces 820 supply power to the computing device 800.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, C++, C#, Objective-C, Java, Swift), including compiled or interpreted languages, and it can be deployed in any form, including as a stand-alone program or as a module, component, subroutine, a browser-based web application, or another unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; solid state drives (SSDs); magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as an LED (light emitting diode) display or LCD (liquid crystal display) monitor or a high-definition display device for displaying information to the user, and a touch screen input device or a keyboard and a pointing device, such as a mouse or a trackball, by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

One or more example tangible processor-readable storage media embody instructions for executing on one or more hardware processors and circuits of a computing device a hardware processor-implemented process for providing machine learning model re-training based on distributed feedback received from a plurality of edge computing devices. The hardware processor-implemented process includes transmitting, via one or more communications networks, a trained instance of a machine learning model to at least one of the plurality of edge computing devices, and collecting, via the one or more communications networks, feedback data from the at least one of the plurality of edge computing devices. The feedback data includes labeled observations generated by the execution of the trained instance of the machine learning model at the at least one of the plurality of edge computing devices on unlabeled observations captured by the at least one of the plurality of edge computing devices. The hardware processor-implemented process also includes generating a re-trained instance of the machine learning model from the trained instance using the collected feedback data and transmitting, via the one or more communications networks, the re-trained instance of the machine learning model to at least one of the plurality of edge computing devices.

Other one or more example tangible processor-readable storage media of any preceding media are provided, wherein the feedback data further includes performance scores describing accuracy of labeled observations generated by the trained instance of the machine learning model executed at the at least one of the plurality of edge computing devices.

Other one or more example tangible processor-readable storage media of any preceding media are provided, wherein the feedback data further includes confidence scores describing a level of confidence associated with each labeled observation generated by the trained instance of the machine learning model executed at the at least one of the plurality of edge computing devices.

Other one or more example tangible processor-readable storage media of any preceding media are provided, wherein the unlabeled observations captured by the at least one of the plurality of edge computing devices are captured by one or more sensors communicatively coupled each of the edge computing devices.

Other one or more example tangible processor-readable storage media of any preceding media are provided, wherein the unlabeled observations are derived from raw data captured by the at least one of the plurality of edge computing devices according to an input specification describing the derivation of the raw data to the unlabeled observations.

Other one or more example tangible processor-readable storage media of any preceding media further embody instructions for transmitting, via the one or more communications networks, the input specification for the machine learning model to the at least one of the plurality of edge computing devices.

Other one or more example tangible processor-readable storage media of any preceding media are provided, wherein the plurality of edge computing devices and/or a plurality of users are segmented into different audiences using a multicast transmission scheme.

Other one or more example tangible processor-readable storage media of any preceding media are provided, wherein the collecting operation includes collecting the feedback data, wherein the feedback data is allocated into different audience segments of the plurality of edge computing devices and/or a plurality of users.

Other one or more example tangible processor-readable storage media of any preceding media are provided, wherein the generating operation includes generating a plurality of re-trained instances, wherein the re-trained instances are allocated into different audience segments of the plurality of edge computing devices and/or a plurality of users.

Other one or more example tangible processor-readable storage media of any preceding media are provided, wherein the operation of transmitting the re-trained instance includes transmitting a plurality of re-trained instances of a machine learning model to different audience segments of the plurality of edge computing devices and/or a plurality of users.

An example method of providing machine learning model re-training based on distributed feedback received from a plurality of edge computing devices is provided. The example method includes transmitting, via one or more communications networks, a trained instance of a machine learning model to at least one of the plurality of edge computing devices and collecting, via the one or more communications networks, feedback data from the at least one of the plurality of edge computing devices. The feedback data includes labeled observations generated by the execution of the trained instance of the machine learning model at the at least one of the plurality of edge computing devices on unlabeled observations captured by the at least one of the plurality of edge computing devices. The example method also includes generating a re-trained instance of the machine learning model from the trained instance using the collected feedback data and transmitting, via the one or more communications networks, the re-trained instance of the machine learning model to at least one of the plurality of edge computing devices.

Another example method of any preceding method is provided, wherein the feedback data further includes performance scores describing accuracy of labeled observations generated by the trained instance of the machine learning model executed at the at least one of the plurality of edge computing devices.

Another example method of any preceding method is provided, wherein the feedback data further includes confidence scores describing a level of confidence associated with each labeled observation generated by the trained instance of the machine learning model executed at the at least one of the plurality of edge computing devices.

Another example method of any preceding method is provided, wherein the unlabeled observations captured by the at least one of the plurality of edge computing devices are captured by one or more sensors communicatively coupled each of the edge computing devices.

Another example method of any preceding method is provided, wherein the unlabeled observations are derived from raw data captured by the at least one of the plurality of edge computing devices according to an input specification describing the derivation of the raw data to the unlabeled observations.

Another example method of any preceding method further includes transmitting, via the one or more communications networks, the input specification for the machine learning model to the at least one of the plurality of edge computing devices.

Another example method of any preceding method is provided, wherein the plurality of edge computing devices and/or a plurality of users are segmented into different audiences using a multicast transmission scheme.

Another example method of any preceding method is provided, wherein the collecting operation includes collecting the feedback data, wherein the feedback data is allocated into different audience segments of the plurality of edge computing devices and/or a plurality of users.

Another example method of any preceding method is provided, wherein the generating operation includes generating a plurality of re-trained instances, wherein the re-trained instances are allocated into different audience segments of the plurality of edge computing devices and/or a plurality of users.

Another example method of any preceding method is provided, wherein the operation of transmitting the re-trained instance includes transmitting a plurality of re-trained instances of a machine learning model to different audience segments of the plurality of edge computing devices and/or a plurality of users.

An example system for providing machine learning model re-training based on distributed feedback received from a plurality of edge computing devices is provided. The example system includes a communications interface configured to transmit, via one or more communications networks, a trained instance of a machine learning model to at least one of the plurality of edge computing devices and a feedback collector coupled to the communications interface and configured to collect, via the one or more communications networks, feedback data from the at least one of the plurality of edge computing devices. The feedback data includes labeled observations generated by the execution of the trained instance of the machine learning model at the at least one of the plurality of edge computing devices on unlabeled observations captured by the at least one of the plurality of edge computing devices. The example system also includes a machine learning model re-trainer configured to generate a re-trained instance of the machine learning model from the trained instance using the collected feedback data, wherein the communications interface is further configured to transmit, via the one or more communications networks, the re-trained instance of the machine learning model to the at least one of the plurality of edge computing devices.

Another example system of any preceding system is provided, wherein the feedback data further includes performance scores describing accuracy of labeled observations generated by the trained instance of the machine learning model executed at the at least one of the plurality of edge computing devices.

Another example system of any preceding system is provided, wherein the feedback data further includes confidence scores describing a level of confidence associated with each labeled observation generated by the trained instance of the machine learning model executed at the at least one of the plurality of edge computing devices.

Another example system of any preceding system is provided, wherein the unlabeled observations captured by the at least one of the plurality of edge computing devices are captured by one or more sensors communicatively coupled each of the edge computing devices.

Another example system of any preceding system is provided, wherein the unlabeled observations are derived from raw data captured by the at least one of the plurality of edge computing devices according to an input specification describing the derivation of the raw data to the unlabeled observations.

Another example system of any preceding system, wherein the input specification for the machine learning model is transmitted, via the one or more communications networks, to the at least one of the plurality of edge computing devices.

Another example system of any preceding system, wherein the plurality of edge computing devices and/or a plurality of users are segmented into different audiences using a multicast transmission scheme.

Another example system of any preceding system, wherein the plurality of edge computing devices and/or a plurality of users are segmented into different audiences using a multicast transmission scheme.

Another example system of any preceding system, wherein the feedback data is allocated into different audience segments of the plurality of edge computing devices and/or a plurality of users.

Another example system of any preceding system, wherein the re-trained instances are allocated into different audience segments of the plurality of edge computing devices and/or a plurality of users.

Another example system of any preceding system, wherein a plurality of re-trained instances of a machine learning model is transmitted to different audience segments of the plurality of edge computing devices and/or a plurality of users.

An example system for providing machine learning model re-training based on distributed feedback received from a plurality of edge computing devices is provided. The example system includes means for transmitting, via one or more communications networks, a trained instance of a machine learning model to at least one of the plurality of edge computing devices and means for collecting, via the one or more communications networks, feedback data from the at least one of the plurality of edge computing devices. The feedback data includes labeled observations generated by the execution of the trained instance of the machine learning model at the at least one of the plurality of edge computing devices on unlabeled observations captured by the at least one of the plurality of edge computing devices. The example method also includes means for generating a re-trained instance of the machine learning model from the trained instance using the collected feedback data and means for transmitting, via the one or more communications networks, the re-trained instance of the machine learning model to at least one of the plurality of edge computing devices.

Another example system of any preceding system is provided, wherein the feedback data further includes performance scores describing accuracy of labeled observations generated by the trained instance of the machine learning model executed at the at least one of the plurality of edge computing devices.

Another example system of any preceding system is provided, wherein the feedback data further includes confidence scores describing a level of confidence associated with each labeled observation generated by the trained instance of the machine learning model executed at the at least one of the plurality of edge computing devices.

Another example system of any preceding system, wherein the unlabeled observations captured by the at least one of the plurality of edge computing devices are captured by one or more sensors communicatively coupled each of the edge computing devices.

Another example system of any preceding system is provided, wherein the unlabeled observations are derived from raw data captured by the at least one of the plurality of edge computing devices according to an input specification describing the derivation of the raw data to the unlabeled observations.

Another example system of any preceding system further includes means for transmitting, via the one or more communications networks, the input specification for the machine learning model to the at least one of the plurality of edge computing devices.

Another example system of any preceding system is provided, wherein the plurality of edge computing devices and/or a plurality of users are segmented into different audiences using a multicast transmission scheme.

Another example system of any preceding system is provided, wherein the means for collecting includes means for collecting the feedback data, wherein the feedback data is allocated into different audience segments of the plurality of edge computing devices and/or a plurality of users.

Another example system of any preceding system is provided, wherein the means for generating includes means generating a plurality of re-trained instances, wherein the re-trained instances are allocated into different audience segments of the plurality of edge computing devices and/or a plurality of users.

Another example system of any preceding system is provided, wherein the means for transmitting the re-trained instance includes means for transmitting a plurality of re-trained instances of a machine learning model to different audience segments of the plurality of edge computing devices and/or a plurality of users.

While this specification contains many specific implementation details, these should not be construed as limitations on the scope of any inventions or of what may be claimed, but rather as descriptions of features specific to particular embodiments of particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. One or more tangible processor-readable storage media devices embodied with instructions for executing on one or more hardware processors and circuits of a computing device a hardware processor-implemented process for providing machine learning model re-training based on distributed feedback received from a plurality of edge computing devices, the hardware processor-implemented process comprising:

transmitting, via one or more communications networks, a trained instance of a machine learning model to at least one of the plurality of edge computing devices;

collecting, via the one or more communications networks, feedback data from the at least one of the plurality of edge computing devices, the feedback data including labeled observations generated by the execution of the trained instance of the machine learning model at the at least one of the plurality of edge computing devices on unlabeled observations captured by the at least one of the plurality of edge computing devices;

generating a re-trained instance of the machine learning model from the trained instance using the collected feedback data; and transmitting, via the one or more communications networks, the re-trained instance of the machine learning model to at least one of the plurality of edge computing devices.

2. The one or more tangible processor-readable storage media devices of claim 1, wherein the feedback data further includes performance scores describing accuracy of labeled observations generated by the trained instance of the machine learning model executed at the at least one of the plurality of edge computing devices.

3. The one or more tangible processor-readable storage media devices of claim 1, wherein the feedback data further includes confidence scores describing a level of confidence associated with each labeled observation generated by the trained instance of the machine learning model executed at the at least one of the plurality of edge computing devices.

4. The one or more tangible processor-readable storage media devices of claim 1, wherein the unlabeled observations captured by the at least one of the plurality of edge computing devices are captured by one or more sensors communicatively coupled each of the edge computing devices.

5. The one or more tangible processor-readable storage media devices of claim 1, wherein the unlabeled observations are derived from raw data captured by the at least one of the plurality of edge computing devices according to an input specification describing the derivation of the raw data to the unlabeled observations.

6. The one or more tangible processor-readable storage media devices of claim 5, wherein the hardware processor-implemented process further comprises:

transmitting, via the one or more communications networks, the input specification for the machine learning model to the at least one of the plurality of edge computing devices.

7. The one or more tangible processor-readable storage media devices of claim 1, wherein the plurality of edge computing devices and/or a plurality of users are segmented into different audiences using a multicast transmission scheme.

8. The one or more tangible processor-readable storage media devices of claim 1, wherein the collecting operation comprises:

collecting the feedback data, wherein the feedback data is allocated into different audience segments of the plurality of edge computing devices and/or a plurality of users.

9. The one or more tangible processor-readable storage media devices of claim 1, wherein the generating operation comprises:

generating a plurality of re-trained instances, wherein the re-trained instances are allocated into different audience segments of the plurality of edge computing devices and/or a plurality of users.

10. The one or more tangible processor-readable storage media devices of claim 1, wherein the operation of transmitting the re-trained instance comprises:
transmitting a plurality of re-trained instances of a machine learning model to different audience segments of the plurality of edge computing devices and/or a plurality of users.

11. A method of providing machine learning model re-training based on distributed feedback received from a plurality of edge computing devices, the method comprising:
transmitting, via one or more communications networks, a trained instance of a machine learning model to at least one of the plurality of edge computing devices;
collecting, via the one or more communications networks, feedback data from the at least one of the plurality of edge computing devices, the feedback data including labeled observations generated by the execution of the trained instance of the machine learning model at the at least one of the plurality of edge computing devices on unlabeled observations captured by the at least one of the plurality of edge computing devices;
generating a re-trained instance of the machine learning model from the trained instance using the collected feedback data; and
transmitting, via the one or more communications networks, the re-trained instance of the machine learning model to at least one of the plurality of edge computing devices.

12. The method of claim 11, wherein the feedback data further includes performance scores describing accuracy of labeled observations generated by the trained instance of the machine learning model executed at the at least one of the plurality of edge computing devices.

13. The method of claim 11, wherein the feedback data further includes confidence scores describing a level of confidence associated with each labeled observation generated by the trained instance of the machine learning model executed at the at least one of the plurality of edge computing devices.

14. The method of claim 11, wherein the unlabeled observations captured by the at least one of the plurality of edge computing devices are captured by one or more sensors communicatively coupled each of the edge computing devices.

15. The method of claim 11, wherein the unlabeled observations are derived from raw data captured by the at least one of the plurality of edge computing devices according to an input specification describing the derivation of the raw data to the unlabeled observations.

16. The method of claim 15, further comprising:
transmitting, via the one or more communications networks, the input specification for the machine learning model to the at least one of the plurality of edge computing devices.

17. The method of claim 11, wherein the plurality of edge computing devices and/or a plurality of users are segmented into different audiences using a multicast transmission scheme.

18. The method of claim 11, wherein the collecting operation comprises:
collecting the feedback data, wherein the feedback data is allocated into different audience segments of the plurality of edge computing devices and/or a plurality of users.

19. The method of claim 11, wherein the generating operation comprises:
generating a plurality of re-trained instances, wherein the re-trained instances are allocated into different audience segments of the plurality of edge computing devices and/or a plurality of users.

20. The method of claim 11, wherein the operation of transmitting the re-trained instance comprises:
transmitting a plurality of re-trained instances of a machine learning model to different audience segments of the plurality of edge computing devices and/or a plurality of users.

21. A system for providing machine learning model re-training based on distributed feedback received from a plurality of edge computing devices, the system comprising:
a communications interface configured to transmit, via one or more communications networks, a trained instance of a machine learning model to at least one of the plurality of edge computing devices;
a feedback collector coupled to the communications interface and configured to collect, via the one or more communications networks, feedback data from the at least one of the plurality of edge computing devices, the feedback data including labeled observations generated by the execution of the trained instance of the machine learning model at the at least one of the plurality of edge computing devices on unlabeled observations captured by the at least one of the plurality of edge computing devices; and
a machine learning model re-trainer configured to generate a re-trained instance of the machine learning model from the trained instance using the collected feedback data, wherein the communications interface is further configured to transmit, via the one or more communications networks, the re-trained instance of the machine learning model to the at least one of the plurality of edge computing devices.

22. The system of claim 21, wherein the feedback data further includes performance scores describing accuracy of labeled observations generated by the trained instance of the machine learning model executed at the at least one of the plurality of edge computing devices.

23. The system of claim 21, wherein the feedback data further includes confidence scores describing a level of confidence associated with each labeled observation generated by the trained instance of the machine learning model executed at the at least one of the plurality of edge computing devices.

24. The system of claim 21, wherein the unlabeled observations captured by the at least one of the plurality of edge computing devices are captured by one or more sensors communicatively coupled each of the edge computing devices.

25. The system of claim 21, wherein the unlabeled observations are derived from raw data captured by the at least one of the plurality of edge computing devices according to an input specification describing the derivation of the raw data to the unlabeled observations.

26. The system of claim 25, wherein the input specification for the machine learning model transmitted, via the one or more communications networks, to the at least one of the plurality of edge computing devices.

27. The system of claim 21, wherein the plurality of edge computing devices and/or a plurality of users are segmented into different audiences using a multicast transmission scheme.

28. The system of claim 21, wherein the feedback data is allocated into different audience segments of the plurality of edge computing devices and/or a plurality of users.

29. The system of claim 21, wherein the re-trained instances are allocated into different audience segments of the plurality of edge computing devices and/or a plurality of users.

30. The system of claim 21, a plurality of re-trained instances of a machine learning model are transmitted to different audience segments of the plurality of edge computing devices and/or a plurality of users.

* * * * *